US007327281B2

(12) United States Patent
Hutchison

(10) Patent No.: US 7,327,281 B2
(45) Date of Patent: Feb. 5, 2008

(54) TRAFFIC SIGNAL WITH INTEGRATED SENSORS

(75) Inventor: Michael Cole Hutchison, Plano, TX (US)

(73) Assignee: M & K Hutchison Investments, LP, Plano, TX (US)

(*) Notice: Subject to any disclaimer, the term of this patent is extended or adjusted under 35 U.S.C. 154(b) by 318 days.

(21) Appl. No.: 11/211,029

(22) Filed: Aug. 24, 2005

(65) Prior Publication Data

US 2007/0052553 A1 Mar. 8, 2007

(51) Int. Cl.
*G08G 1/095* (2006.01)
*H04N 7/18* (2006.01)

(52) U.S. Cl. ...................... 340/907; 340/908; 340/916; 340/937; 340/815.4; 40/564; 348/149; 348/151; 362/362; 362/800

(58) Field of Classification Search ................. 340/907
See application file for complete search history.

(56) References Cited

U.S. PATENT DOCUMENTS 3,729,706 A 4/1973 Hein
5,457,450 A * 10/1995 Deese et al. ................ 340/912
6,426,704 B1 7/2002 Hutchison ................ 340/693.5
6,450,662 B1 9/2002 Hutchison ................... 362/246
6,466,260 B1 * 10/2002 Hatae et al. ................ 348/149
6,614,358 B1 * 9/2003 Hutchison et al. ..... 340/815.45
2005/0030203 A1 2/2005 Sharp et al.
2005/0094407 A1 * 5/2005 Heald et al. ................ 362/362
2005/0099319 A1 5/2005 Hutchison et al.

* cited by examiner

*Primary Examiner*—Donnie L. Crosland
(74) *Attorney, Agent, or Firm*—Duke W. Yee; Theodore D. Fay, III

(57) ABSTRACT

A traffic signal with integrated sensors. The present invention provides an apparatus for integrating sensors with a traffic signal. A signal case has a housing and a light source placed within the housing. A door attached to the housing is configured such that photons generated by the light may be sensed outside the housing. A tab is attached to the door. A sensor is attached to the tab. The housing or the door is adapted to allow the sensor to sense a parameter originating from outside the housing.

20 Claims, 4 Drawing Sheets

TRAFFIC SIGNAL WITH INTEGRATED SENSORS

BACKGROUND OF THE INVENTION

1. Technical Field

The present invention relates generally to traffic signals. Still more particularly, the present invention relates to a traffic signal having one or more sensors integrated with the traffic signal housing.

2. Description of Related Art

Traffic signals for directing traffic at road intersections are ubiquitous and have been known for decades. More recently, traffic signal cabinets have been equipped with communications equipment that allows local law enforcement, fire departments, and various government agencies to better optimize the control of traffic signals. In addition, cameras and microphones have been located at various points at intersections to monitor traffic, detect violations of traffic laws, and generally monitor intersections for criminal activity.

Various government agencies responsible for maintaining intersections and traffic signals are interested in further increasing the ability to monitor intersections. For example, agencies responsible for civil defense are interested in adding nuclear, biological, or chemical sensors at intersections because the communications infrastructure required to coordinate so many of these sensors is likely to already be in place. However, the cost of many of these sensors can be high, especially because the sensors must be resistant to weather, vandalism, and other dangers. Thus, it would be advantageous to have an improved apparatus for providing a variety of sensors at traffic intersections.

SUMMARY OF THE INVENTION

The present invention provides an apparatus for integrating sensors with a traffic signal. A signal case has a housing and a light source placed within the housing. A door attached to the housing is configured such that photons generated by the light may be sensed outside the housing. A tab is attached to the door. A sensor is attached to the tab. The housing or the door is adapted to allow the sensor to sense a parameter originating from outside the housing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
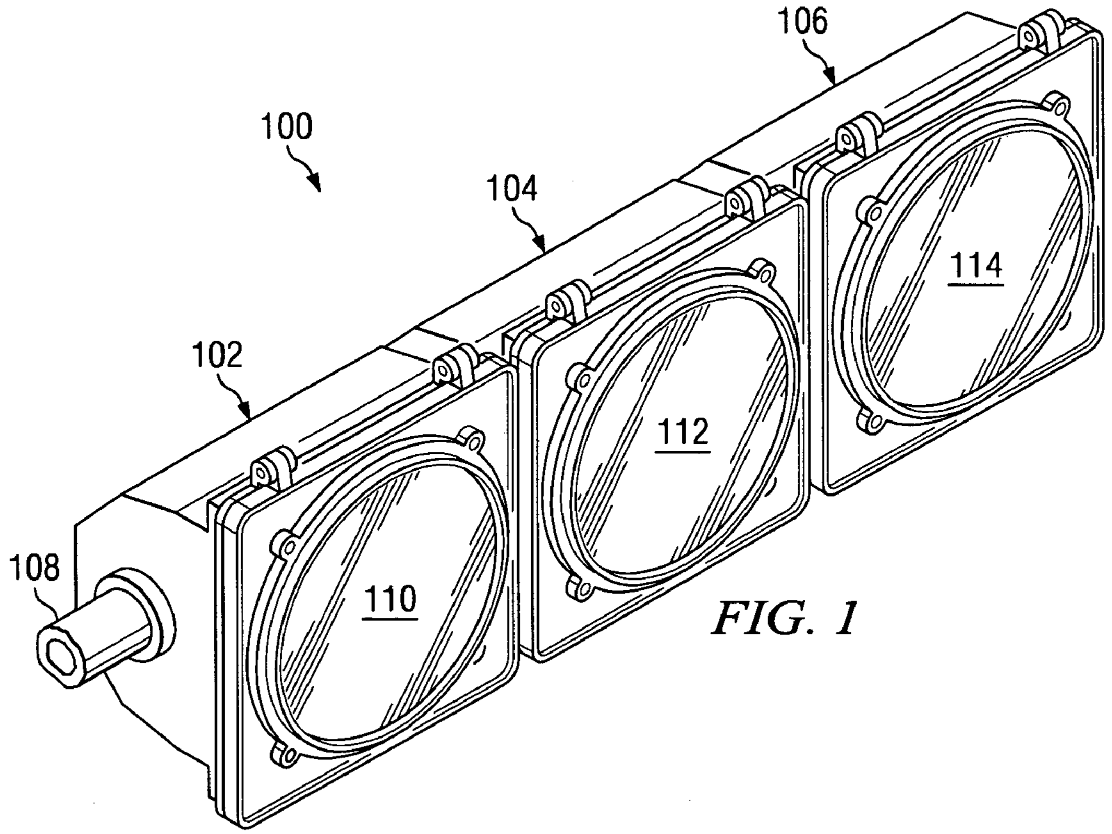
FIG. 1 shows a traffic signal in accordance with an illustrative embodiment of the present invention.

With reference now to the figures, FIG. 1 shows traffic signal 100 in accordance with an illustrative embodiment of the present invention. Traffic signal 100 includes three signal cases, such as signal cases 102, 104, and 106. These signal cases are connected to each other via rod 108. Rod 108 is attached to a traffic signal pole, wire, or other support, not shown, such that drivers can see traffic signal 100. Wires, cables, or other means for transferring power and data signals are attached to signal cases 102, 104, and 106, with wires or cables possibly routed through rod 108.

Each signal case includes a lens, such as lenses 110, 112, and 114, through which light is emitted. Each lens is provided with an appropriate color, such as red, yellow, and green, respectively, and possibly a mask, such as an arrow.

Traffic signal 100 may take a variety of forms. For example, more or fewer signal cases may be provided. Even one signal case may be utilized as a traffic signal. One or more signal cases, such as signal cases 102, 104, and 106, may be placed inside of a traffic light casing, as opposed to being connected together via rod 108. In addition, each signal case may be provided and deployed separately, such that a traffic light casing or rod is not required. Thus, the mechanism of the present invention may be provided in a wide variety of traffic light arrangements other than those shown. The particular arrangement of signal cases 102, 104, and 106 is present for purposes of illustration and not meant to imply architectural limitations as to the number or arrangement of different signal cases.

Figure 2:
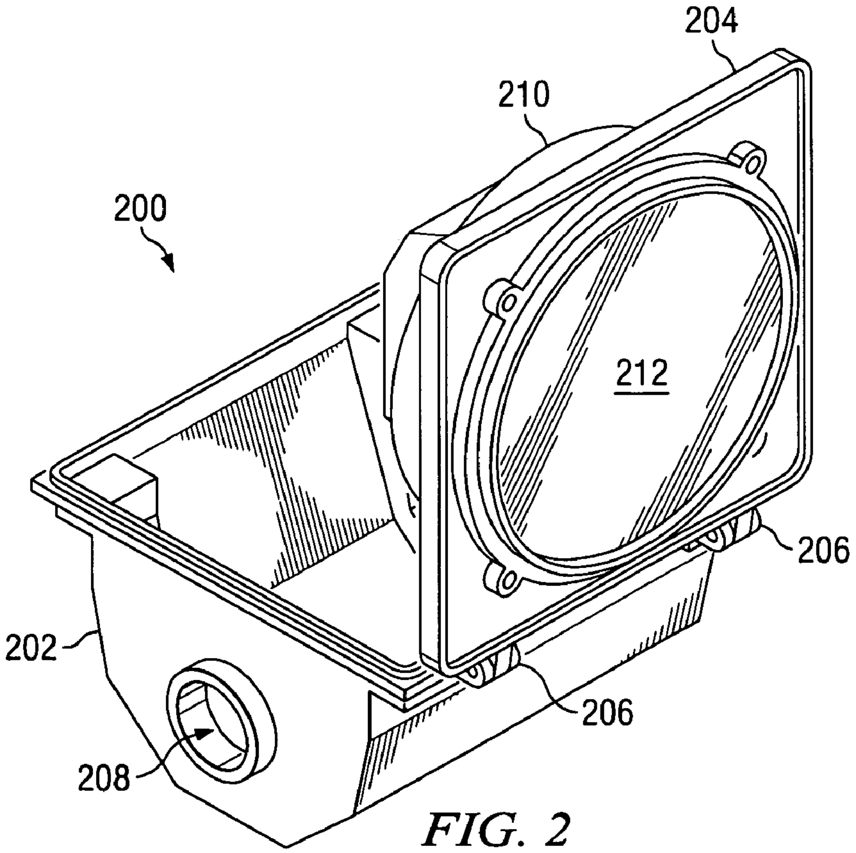
FIG. 2 shows a signal case for use in the traffic signal shown in FIG. 1 in accordance with an illustrative embodiment of the present invention.

FIG. 2 shows a signal case for use in the traffic signal shown in FIG. 1 in accordance with an illustrative embodiment of the present invention. In this example, signal case 200 includes housing 202 and door 204. Door 204 also may be referred to as a lid, top, or cap. Although door 204 is connected to housing 202 via hinges 206, door 204 may be connected to housing 202 via any suitable method. For example, door 204 may be rotatably attached to housing 202, slidably attached to housing 202, screwed to housing 202, bolted to housing 202, adhered to housing 202, twistably attached to housing 202, and may be otherwise removably attachable to housing 202. In addition, one or more latches, brackets, screws, bolts, or other attachment means, not shown, may be used to secure door 204 to housing 202.

In the illustrative examples, door 204 is operably attached to housing 202 to allow access to the interior of housing 202. By being operably attached to housing 202, door 204 may be opened or otherwise removed to reveal the interior of housing 202. In another illustrative example, door 204 may instead be permanently attached to housing 202 such that door 204 becomes one of the sides of housing 202. Slot 208 is optionally provided, should signal case 200 take the form of one of the signal cases shown in FIG. 1.

Signal case 200 also includes light source module 210, which contains a light source. In an illustrative example, the light source is a solid-state light emitting diode array, such as that shown in Hutchison, *Modular Upgradable Solid State Light Source for Traffic Control*, U.S. Pat. No. 6,426,704 (Jul. 30, 2002). However, the light source may be an incandescent bulb or any other suitable light source. Photons emitted by the light source travel through lens 212 and thereafter may be sensed. In the depicted examples, door 204 is configured such that photons generated by the light source may be sensed outside housing 202. Thus, a driver can see light emitted through lens 212. As described above, lens 212 may be a variety of colors, such as red, yellow, green, and may be provided with a mask or silhouette, such as an arrow for indicating direction of traffic flow.

Figure 3:
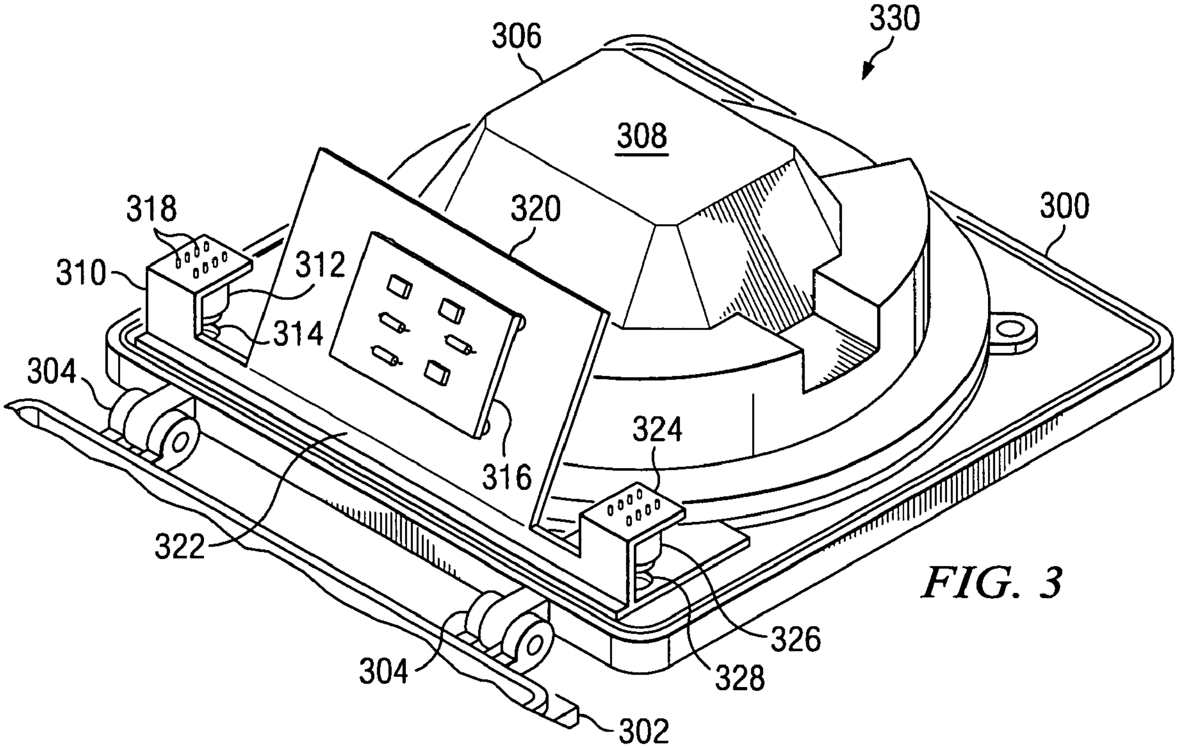
FIG. 3 is a diagram of an inside view of a door from FIG. 2 in accordance with an illustrative embodiment of the present invention.

In FIG. 3, a diagram of an inside view of a door from FIG. 2 is depicted in accordance with an illustrative embodiment of the present invention. Door 300 shows the inside portion of door 204 in FIG. 2. In this example, door 300 is rotatably attached to housing 302 via hinges 304. Similarly, light source module 306 is attached to door 300, with a light source, not shown, disposed on the opposite side of light source module surface 308.

In addition, tab 310 is attached to door 300. Sensor 312 is attached to tab 310, though sensor 312 may be disposed elsewhere on door 300, within housing 302, or may be disposed outside signal case 330, such as in a separate housing attached to housing 302. Depending on the type of sensor used, aperture 314 may be placed in door 300 in any suitable manner that sensor 312 may be used. For example, if sensor 312 is a camera, then aperture 314 is configured such that light may travel from outside door 300 into the camera. In another example, if sensor 312 is a microphone, then aperture 314 may instead take the form of a cluster of small apertures instead of a single large aperture, as shown. The cluster of small apertures allows the microphone to more easily detect or sense sound waves from sources outside signal case 330, while protecting the microphone. In another example, if sensor 312 is a biological sensor, then aperture 314 may be a cluster of small apertures, a mesh, or a filter. Furthermore, a small fan may be attached to door 300, or otherwise provided in signal case 330, to draw outside air through door 300 and into the biological sensor. On the other hand, if sensor 312 is a nuclear sensor designed to detect or sense gamma rays, then aperture is not needed when housing 302 is made of plastic. Hence, at least one of housing 302 or door 300 may be adapted to allow the sensor to sense a parameter outside the housing. The term "sense" as used herein means to detect, sense, measure, or record a parameter. The parameter may be anything that can be detected, measured, or recorded by a sensor, such as light color or intensity, or any other kind of parameter in the case of different kinds of sensors, such as a radiation count or other parameters.

In this illustrative example, sensor 312 is disposed such that sensor 312 is located wholly inside housing 302 when door 300 is shut to provide maximum protection to sensor 312. However, a portion of sensor 312 may extend through aperture 314, if necessary or desirable for operation of sensor 312.

In addition to sensor 312, control board 316 may be provided to control operation of sensor 312. Control board 316 is operably connected to sensor 312 by any suitable means, such as via wires connected to pins 318, via a wireless connection, or by any other suitable method. By being operably connected to sensor 312, control board 316 is connected to sensor 312 in such a way that control board 316 may control the operation of sensor 312. Control board 316 may be a circuit board, computer card, or any suitable hardware and software for controlling sensor 312.

In turn, control board 316 is attached to backboard 320. Backboard 320 is attached to door 300. In this manner, control board 316 is attached to door 300 through its attachment to backboard 320. In these examples, backboard 320 provides a convenient surface to mount control board 316. However, control board 316 may be otherwise attached to other components in other locations, such as door 300, light source module 306, housing 302, or within housing 302 of signal case 330. In other illustrative examples, control board 316 may be placed in a separate protective housing disposed outside housing 302.

One or more of control board 316 and sensor 312 may be connected to a communications center and a power source via wired or wireless communications methods. The communications center allows a user to remotely control sensor 312 and to remotely gather data from sensor 312. Thus, for example, a user may monitor video or pictures from sensor 312 in the form of a camera. In another illustrative example, control board 316 may include one or more forms of non-volatile memory for storing data. Thus, pictures or other data may be stored in signal case 330 for later retrieval. Data may be retrieved directly by directly connecting to the non-volatile memory, or remotely via the communications center.

In addition, multiple sensors and tabs may be provided. For example, second tab 324 may be attached to door 300 and second sensor 326 may be attached to second tab 324. Second aperture 328 may also be provided, if necessary or desirable for the operation of second sensor 326. Second tab 324 and second sensor 326 may be sized, dimensioned, arranged, and may otherwise operate as described with respect to tab 310 and sensor 312.

In these illustrative examples, frame 322 is present. Tab 310, and optionally backboard 320, control board 316, second tab 324, and second sensor 326 may be attached to or otherwise be a part of frame 322. Frame 322 allows existing signal cases to be easily fitted with one or more sensors. Thus, in an existing signal case without sensors, door 300 may be opened, frame 322 attached to door 300 or housing 302 using screws, adhesives or other suitable methods, and apertures 314 and 328 drilled. Frame 322 may be removably attachable to door 300 or housing 302 such that frame 322 may be easily replaced.

Frame 322 may have a variety of shapes and dimensions, depending on the number and type of sensors used and the desired location of sensors within signal case 330. Frame 322 may extend over light source module 306 and may completely cover light source module 306. In this case, frame 322 may provide multiple tabs and may provide multiple mounting surfaces for multiple sensors and multiple control boards. In another illustrative example, frame 322 may be adjustable or one or more portions of frame 322 may be adjustable to allow easier access to sensors or control boards. As used herein, the term adjustable means flexible, movable, moldable, or otherwise capable of being adjusted such that a user may manipulate the frame or tab.

In other illustrative examples, one or more sensors may be attached to door 300 or housing 302 using tabs or other means, with control functions for the sensors provided at the communications center. Thus, control board 316 is optional. Likewise, tab 310 is optional if some other means is used to mount sensor 312 to door 300 or housing 302.

Figure 4:
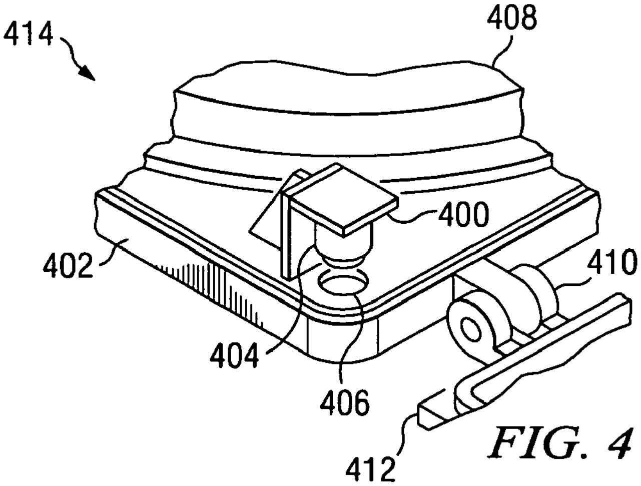
FIG. 4 shows a camera attached to a tab that is, itself, attached to the door of the signal case shown in FIG. 2 in accordance with an illustrative embodiment of the present invention.

FIG. 4 shows a camera attached to a tab that is, itself, attached to the door of the signal case shown in FIG. 2 in accordance with an illustrative example of the present invention. Tab 400 is attached to door 402. Sensor 404 is attached to tab 400 opposite aperture 406. Light source module 408, hinge 410, and housing 412 are shown for reference.

Tab 400 may take a variety of shapes and forms and may be disposed on door 402 in any suitable manner. For example, tab 400 may be an L-shaped bracket integrally formed with door 402, as shown in FIG. 4. In this case, the base of sensor 404 is attached to the seat of the L-shaped bracket so that sensor 404 faces aperture 406. Therefore, tab 400 is a mounting surface for sensor 404. Tab 400 may be adjustable such that a person may manipulate tab 400 to provide access to sensor 404. Thus, tab 400 may be flexible such that a person may bend tab 400 to gain easy access to sensor 404. In another example, tab 400 may be manufactured separately and attached to door 402 in the manner shown. In another example, tab 400 may have a different shape that accommodates a particular type or shape of sensor 404. In yet another example, tab 400 is part of a frame, such as frame 322 in FIG. 3, to which the sensor control board may also be attached. Thus, in signal cases that do not already have tabs or control boards, a frame may be quickly and easily attached to door 402. The frame includes tab 400, sensor 404, and a control board, and may include additional tabs and additional sensors.

In addition, sensor 404 may be a variety of sensors. For example, sensor 404 may be a nuclear sensor, a chemical sensor, a bacteriological sensor, an audio sensor, a motion sensor, a thermometer, or a moisture sensor. In each case, any suitable sub-type of sensor may be used. For example, a nuclear sensor can be used to detect or sense alpha particles, beta particles, or high energy photons. A chemical sensor can be designed to detect or sense chemical weapons, such as sarin, soman, or VX gas, or to detect or sense other compounds, such as nitrates, TNT, or other explosives. A bacteriological sensor can be utilized to detect or sense various bacteria, such as anthrax, staff, or other bacteria. An audio sensor may be a microphone and may be a directional microphone. A motion sensor may sense the motion of cars or pedestrians. A thermometer may track the temperature of the surrounding area. A moisture sensor can sense the humidity or even rainfall levels in the area of the sensor.

In addition, any other sensor may be used to implement sensor 404, so long as the particular sensor is sized and dimensioned to fit within signal case 414 and is sufficiently durable to survive conditions inside signal case 414. Furthermore, multiple sensors may be provided. Thus, signal case 414 may include one or more arrays of different kinds of sensors. Each sensor may be disposed on a tab, or may be otherwise attached to door 402, light source module 408, or housing 412.

Figure 5:
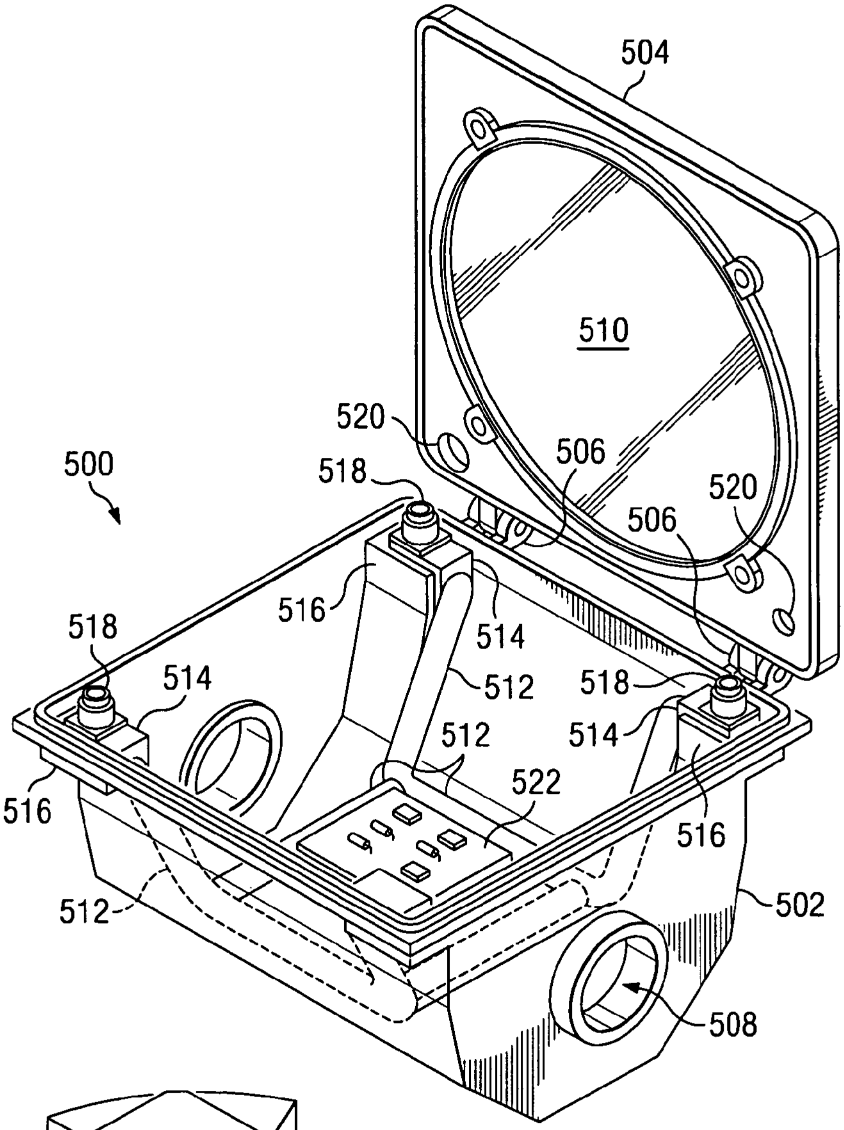
FIG. 5 shows the inside portion of the housing of the signal case shown in FIG. 2 in accordance with an illustrative embodiment of the present invention.

FIG. 5 shows the inside portion of the housing of the signal case shown in FIG. 2 in accordance with an illustrative embodiment of the present invention. As with signal case 200 shown in FIG. 2, signal case 500 includes housing 502, door 504, hinges 506, slot 508, and lens 510 arranged as described with respect to FIG. 1 and FIG. 2. In addition, frame 512 is shown inside housing 502. Portions of frame 512 are shown in phantom to show its position inside housing 502. Frame 512 rests inside housing 502, though frame 512 may be mounted or attached to housing 502 using any suitable method, such as screws, latches, or adhesives. In this illustrative example, frame 512 includes tabs 514 that rest against or are attached to mounts 516 provided within housing 502.

One or more sensors 518 are mounted on tabs 514. Each sensor in sensors 518 may be one of a variety of types of sensors and may operate as described with respect to FIG. 3 and FIG. 4. One or more apertures 520 may be provided to allow for the operation of sensors 518, as described with respect to FIG. 3 and FIG. 4. In addition, one or more control boards, such as control board 522, may be provided to control sensors 518. Control board 522 is attached to frame 512 via any suitable method, such as via welding, latches, screws, or an adhesive.

Frame 512 may be fashioned from a variety of materials, such as metal or plastic, and may be formed from a group of interconnecting rods or bars. Frame 512 is sized and dimensioned to accommodate the size and dimensions of a light source module attached to a door, such as light source module 306 in FIG. 3, and to accommodate the size and dimensions of the door and housing. Frame 512 may be attached directly to door 504 or may be attached to or otherwise disposed in housing 502.

In this illustrative example, frame 512 is adjustable and sized and dimensioned to fit snugly within housing 502. In these illustrative examples, frame 512 is flexible. Thus, frame 512 may be bent slightly, inserted into housing 502, and then allowed to rebound into its original shape such that frame 512 fits snugly inside housing 502. Hence, frame 512 allows sensors 518 and one or more control boards to be quickly and easily inserted into housing 502.

Figure 6:
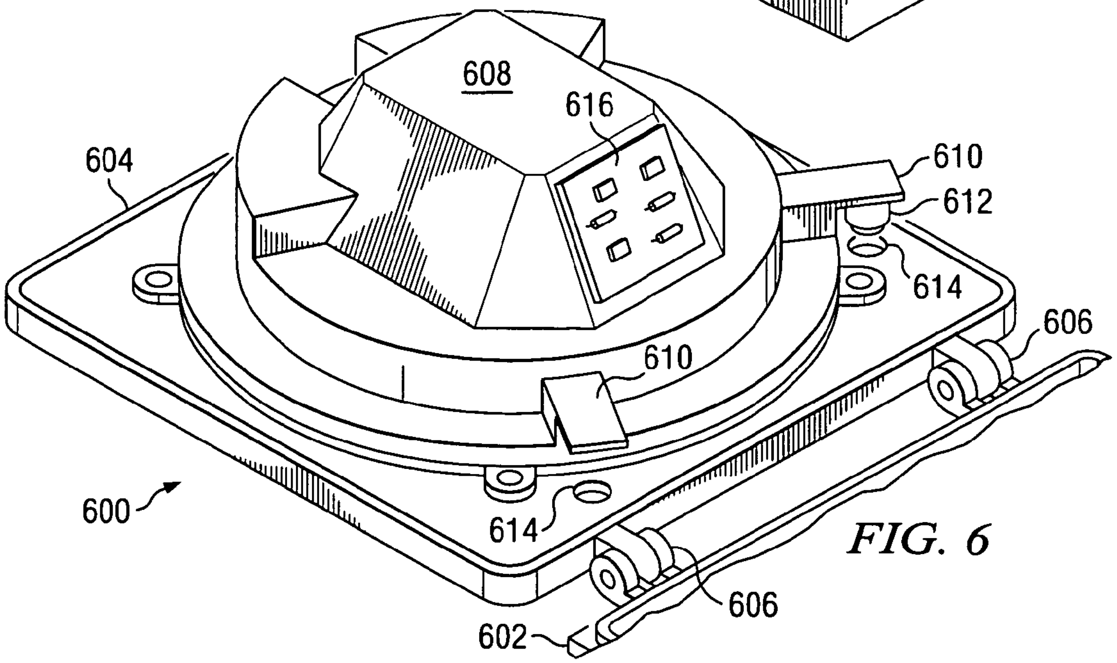
FIG. 6 shows the inside portion of the door of a signal case in accordance with an illustrative embodiment of the present invention.

FIG. 6 shows the inside portion of the door of a signal case in accordance with an illustrative embodiment of the present invention. As with the illustrative example shown in FIG. 3, signal case 600 includes housing 602, door 604 connected to housing 602 via hinges 606, and light source module 608.

As shown in this illustrative example, tabs 610 may be directly attached to or integrally formed with light source module 608. One or more sensors 612 may depend from tabs 610 opposite apertures 614. Control board 616 is directly attached to light source module 608, though control board 616 may be disposed within light source module 608 or on the opposite side of light source module 608. Sensors 612, control board 616, and apertures 614 operate in a manner similar to that described with respect to FIG. 3 and FIG. 4.

Figure 7:
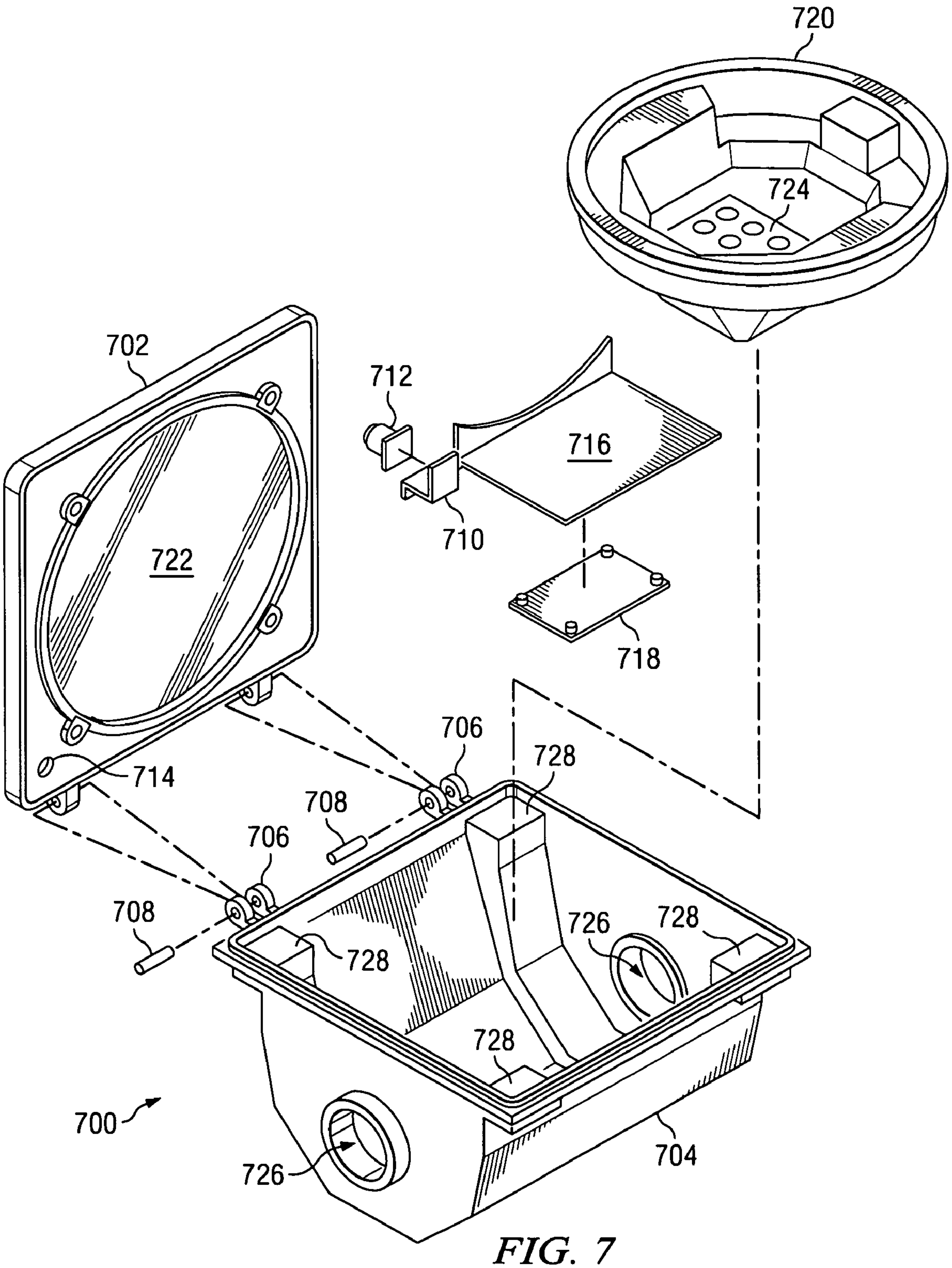
FIG. 7 shows an exploded view of a signal case in accordance with an illustrative embodiment of the present invention.

FIG. 7 shows an exploded view of a signal case in accordance with an illustrative example of the present invention. Signal case 700 includes door 702 attached to housing 704 via hinges 706 and hinge pins 708. Tab 710 is attached to door 702 and sensor 712 is attached to tab 710 opposite aperture 714 in door 702. Backboard 716 is attached to door 702 and control board 718 is attached to backboard 716.

In addition, light source module 720 is attached to lens 722 in door 702. When door 702 is shut, light source module 720 is disposed within housing 704. Light source module 720 includes light source 724, which, as shown, is a light emitting diode array. Of course, other types of light sources may be used in place of or in addition to light emitting diode array 724. Slot 726 is provided in housing 704 for use in connecting multiple signal cases together, as described in FIG. 1. Mounts 728 are provided in housing 704 to facilitate insertion of a frame, such as frame 512 in FIG. 5.

In use, signal case 700 is operated as a traffic light. Sensor 712 is used to sense some desired parameter while the traffic light is operating, or, if desired, when the traffic light is not operating. For example, sensor 712 may be a camera that takes pictures or video of object or events within the field of view of the camera.

The aspects of present invention have several advantages over currently available traffic signals. For example, by including sensors within the signal case itself, the sensor is protected from the elements and from vandals. In addition, the chance of a person noticing the sensors is reduced. For this reason, the sensor or sensors are more likely to capture criminal activity. By attaching the sensors to a frame, the sensors may be quickly and cost effectively added to existing signal cases or other types of traffic signals.

The description of the different aspects of the present invention have been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A signal case for use as a traffic signal, the signal case comprising:

a housing;

a light source disposed within the housing;

a door operably attached to the housing, wherein the door is configured such that photons generated by the light source may be sensed outside the housing;

a tab attached to the door; and a sensor attached to the tab, wherein one of the housing and the door is configured to allow the sensor to sense a parameter originating from outside the housing.

2. The signal case of claim 1 wherein the sensor comprises a camera and wherein an aperture is disposed in the door opposite the tab such that light may pass through the aperture and into the camera.

3. The signal case of claim 1 further comprising a control board operably connected to the sensor, the control board disposed within the housing and operable to control operation of the sensor.

4. The signal case of claim 3 wherein the control board is attached to one of the door, a light source module attached to and disposed within the housing, and a frame attached to the door.

5. The signal case of claim 1 wherein the sensor is wholly disposed within the housing when the door is shut.

6. The signal case of claim 1 wherein the sensor is selected from the group consisting of a nuclear sensor, a chemical sensor, a bacteriological sensor, an audio sensor, a motion sensor, a thermometer, and a moisture sensor.

7. The signal case of claim 1 further comprising a light source module attached to the door, wherein the light source is disposed within the light source module and wherein the tab is attached to the light source module.

8. The signal case of claim 1 further comprising:

a second tab attached to the door; and a second sensor attached to the second tab, wherein one of the housing and the door is configured to allow the second sensor to operate.

9. A signal case for use as a traffic signal, the signal case comprising:

a housing;

a light source disposed within the housing;

a door operably attached to the housing, wherein the door is configured such that photons generated by the light source may be sensed outside the housing;

a frame attached to the door;

a tab attached to the frame; and a sensor attached to the tab, wherein one of the housing and the door is configured to allow the sensor to sense a parameter originating from outside the housing.

10. The signal case of claim 9 wherein the sensor comprises a camera and wherein an aperture is disposed in the door opposite the tab such that light may pass through the aperture and into the camera.

11. The signal case of claim 9 wherein the control board is attached to one of the door, a light source module attached to and disposed within the housing, and the frame.

12. The signal case of claim 9 wherein the frame is removably attachable to the door.

13. The signal case of claim 9 wherein the sensor is wholly disposed within the housing when the door is shut.

14. The signal case of claim 9 wherein the sensor is selected from the group consisting of a nuclear sensor, a chemical sensor, a bacteriological sensor, an audio sensor, a motion sensor, a thermometer, and a moisture sensor.

15. The signal case of claim 9 wherein one of the frame and the tab is adjustable.

16. The signal case of claim 9 further comprising:

a second sensor attached to the frame, wherein one of the housing and the door is configured to allow the second sensor to operate.

17. A signal case for use as a traffic signal, the signal case comprising:

a housing; a door operably attached to the housing;

a light source module disposed within the housing;

a frame disposed between the light source module and the housing; and a sensor attached to the frame, wherein one of the housing and the door is configured to allow the sensor to sense a parameter originating from outside the housing.

18. The signal case of claim 17 wherein the sensor comprises a camera and wherein an aperture is disposed in the housing opposite the camera such that light may pass through the aperture and into the camera.

19. The signal case of claim 17 further comprising a control board attached to one of the frame, a door, and a light source module attached to and disposed within the signal housing, wherein the control board is operable to control operation of the sensor.

20. The signal case of claim 17 further comprising a door operably attached to the housing, wherein a light source module is attached to the door, and wherein the frame is disposed opposite the light source module relative to the door.

* * * * *